US012589649B2

(12) United States Patent
Valeri et al.

(10) Patent No.: US 12,589,649 B2
(45) Date of Patent: Mar. 31, 2026

(54) HAPTIC FEEDBACK SYSTEMS FOR VEHICLE ACCELERATION PEDALS

(71) Applicant: GM GLOBAL TECHNOLOGY OPERATIONS LLC, Detroit, MI (US)

(72) Inventors: Frank C. Valeri, Novi, MI (US); Christopher A. Archer, Lake Orion, MI (US); Jigar Kapadia, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 197 days.

(21) Appl. No.: 18/498,507

(22) Filed: Oct. 31, 2023

(65) Prior Publication Data

US 2025/0135881 A1 May 1, 2025

(51) Int. Cl.
*G07C 5/00* (2006.01)
*B60K 26/02* (2006.01)
*G07C 5/02* (2006.01)
*G07C 5/04* (2006.01)
*G07C 5/08* (2006.01)

(52) U.S. Cl.
CPC ...... *B60K 26/021* (2013.01); *B60K 2026/022* (2013.01)

(58) Field of Classification Search
CPC .................... B60K 26/021; B60K 2026/022
See application file for complete search history.

(56) References Cited

U.S. PATENT DOCUMENTS

| | | | | |
|---|---|---|---|---|
| 3,953,714 A | * | 4/1976 | Gabillard | B61L 3/121 |
| | | | | 246/187 B |
| 11,396,306 B2 | | 7/2022 | Valeri et al. | |
| 2009/0105895 A1 | * | 4/2009 | Shige | B60L 15/20 |
| | | | | 701/22 |
| 2009/0281701 A1 | * | 11/2009 | Kargman | B60K 26/021 |
| | | | | 701/70 |
| 2012/0143439 A1 | * | 6/2012 | Kim | B60W 50/16 |
| | | | | 701/36 |

(Continued)

FOREIGN PATENT DOCUMENTS

| | | |
|---|---|---|
| DE | 10 2017 212 195 A1 | 1/2019 |
| DE | 10 2021 131 529 A1 | 6/2023 |

OTHER PUBLICATIONS

Office Action issued Jul. 3, 2024 in German Application No. 10 2023 136 411.1; 10pgs.

*Primary Examiner* — Kito R Robinson
*Assistant Examiner* — Anthony Gabriel Mora

(57) ABSTRACT

A haptic feedback system for a vehicle acceleration pedal includes an acceleration pedal configured to control acceleration of a motor of a vehicle, and a vibration transducer mechanically connected with the acceleration pedal. The vibration transducer is configured to vibrate the acceleration pedal according to a haptic feedback signal supplied to the vibration transducer. The haptic feedback system includes at least one vehicle sensor configured to sense one or more vehicle operation parameters, and a vehicle control module configured to obtain the one or more vehicle operation parameters via the at least one vehicle sensor, and selectively supply the haptic feedback signal to the vibration transducer according to the one or more vehicle operation parameters, to selectively vibrate the acceleration pedal.

19 Claims, 5 Drawing Sheets

(56)     References Cited

U.S. PATENT DOCUMENTS

| | | | | |
|---|---|---|---|---|
| 2014/0298949 | A1* | 10/2014 | Brown | G05G 1/40 |
| | | | | 74/513 |
| 2014/0330499 | A1* | 11/2014 | Sieber | B60K 26/021 |
| | | | | 701/70 |
| 2015/0291152 | A1* | 10/2015 | Mould | B60W 20/19 |
| | | | | 180/65.225 |
| 2016/0274665 | A1* | 9/2016 | Wakuda | H02K 33/02 |
| 2018/0039331 | A1* | 2/2018 | Warren | G06F 3/043 |
| 2020/0353903 | A1* | 11/2020 | Valeri | B60T 17/22 |
| 2021/0052980 | A1* | 2/2021 | Lindemann | H04R 1/025 |
| 2021/0370967 | A1* | 12/2021 | Valeri | B60W 50/04 |
| 2022/0105793 | A1* | 4/2022 | Sukhatankar | B60W 30/19 |
| 2023/0311911 | A1* | 10/2023 | Camhi | B60T 7/042 |
| | | | | 701/36 |
| 2025/0058630 | A1* | 2/2025 | Sasaki | B60T 17/02 |

* cited by examiner

202

204

1

HAPTIC FEEDBACK SYSTEMS FOR VEHICLE ACCELERATION PEDALS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to haptic feedback signals for vehicle acceleration pedals, including applied vibration to acceleration pedals in vehicles with electric motors.

When customers drive electric vehicles, there may be less of a sense of power and speed of the vehicle via feedback through the acceleration pedal, as compared to internal combustion engine vehicles. Because electric motors are quiet and produce little or no vibrations, drivers do not have a reference for the amount of power being applied to the vehicle via the acceleration pedal. In internal combustion engines, these subtle vibrations and sounds may enhance driver awareness and serve as an indirect communication between the vehicle engine and the driver.

SUMMARY

A haptic feedback system for a vehicle acceleration pedal includes an acceleration pedal configured to control acceleration of a motor of a vehicle, a vibration transducer mechanically connected with the acceleration pedal, the vibration transducer configured to vibrate the acceleration pedal according to a haptic feedback signal supplied to the vibration transducer, at least one vehicle sensor configured to sense one or more vehicle operation parameters, and a vehicle control module configured to obtain the one or more vehicle operation parameters via the at least one vehicle sensor, and selectively supply the haptic feedback signal to the vibration transducer according to the one or more vehicle operation parameters, to selectively vibrate the acceleration pedal.

In other features, the vehicle control module is configured to determine a drive mode setting of the vehicle, supply the haptic feedback signal to the vibration transducer in response to a determination that the drive mode setting is a sport mode, and inhibit supplying the haptic feedback signal to the vibration transducer in response to a determination that the drive mode setting is an economy mode.

In other features, the motor is an electric motor powered by at least one battery of the vehicle.

In other features, the vehicle control module is configured to determine a propulsion limitation condition of the vehicle according to a state of charge of the at least one battery, supply the haptic feedback signal to the vibration transducer in response to a determination that the state of charge is greater than a propulsion limitation threshold, and inhibit supplying the haptic feedback signal to the vibration transducer in response to a determination that the state of charge is less than the propulsion limitation threshold.

In other features, the vehicle control module is configured to determine a transmission gear state of the vehicle, supply the haptic feedback signal to the vibration transducer in response to a determination that the transmission gear state is a drive gear state or a reverse gear state, and inhibit supplying the haptic feedback signal to the vibration transducer in response to a determination that the transmission gear state is a neutral state.

In other features, the vehicle control module is configured to determine a position of a brake pedal of the vehicle, and apply a gain multiplier value to the haptic feedback signal in response to a determination that the brake pedal is in depressed position.

In other features, the vehicle control module is configured to obtain a position of the acceleration pedal, determine a signal frequency corresponding to the position of the acceleration pedal, and supply the haptic feedback signal to the vibration transducer at the determined signal frequency corresponding to the position of the acceleration pedal.

In other features, the vehicle control module is configured to select a first frequency value in response to the position of the acceleration pedal being depressed within a first depression distance range, and select a second frequency value in response to the position of the acceleration pedal being depressed within a second depression distance range, wherein the second frequency value is greater than the first frequency value, and the second depression distance range is greater than the first depression distance range.

In other features, the vehicle control module is configured to obtain a longitudinal acceleration value of the vehicle, determine a frequency gain value corresponding to the longitudinal acceleration value of the vehicle, and apply the determined frequency gain value to the haptic feedback signal supplied to the vibration transducer.

In other features, the signal frequency is in a range from ten vibrations per millisecond to forty vibrations per millisecond.

In other features, the one or more vehicle operation parameters include at least one a drive mode setting of the vehicle, a state of charge of a battery of the vehicle, a transmission gear state of the vehicle, a position of a brake pedal of the vehicle, a position of the acceleration pedal, a speed value of the vehicle, and an acceleration value of the vehicle.

In other features, the vehicle control module is configured to obtain the one or more vehicle operation parameters via a controller area network (CAN) bus of the vehicle.

In other features, the haptic feedback signal supplied to the vibration transducer includes at least one of a triangle wave signal and a square wave signal.

In other features, the vehicle control module is configured to selectively supply haptic feedback to vibrate at least one of a steering wheel of the vehicle, a brake pedal of the vehicle, a seat of the vehicle, a door panel of the vehicle, or a center console of the vehicle, according to the one or more vehicle operation parameters.

In other features, the vehicle control module is configured to selectively control a level of brightness of one or more lights of a dashboard of the vehicle, according to the one or more vehicle operation parameters.

In other features, the vehicle control module is configured to selectively control at least one speaker of the vehicle to generate a simulated internal combustion engine noise, according to the one or more vehicle operation parameters.

A method of controlling haptic feedback system for a vehicle acceleration pedal includes controlling acceleration of a motor of a vehicle via a position of an acceleration pedal, vibrating the acceleration pedal via a vibration transducer mechanically connected with the acceleration pedal, the vibration transducer configured to vibrate the acceleration pedal according to a haptic feedback signal supplied to the vibration transducer, sensing one or more vehicle operation parameters via at least one vehicle sensor, and selectively supplying the haptic feedback signal to the vibration transducer according to the one or more vehicle operation parameters, to selectively vibrate the acceleration pedal.

In other features, the method includes determining a drive mode setting of the vehicle, supplying the haptic feedback signal to the vibration transducer in response to a determination that the drive mode setting is a sport mode, and inhibiting supplying the haptic feedback signal to the vibration transducer in response to a determination that the drive mode setting is an economy mode.

In other features, the motor is an electric motor powered by at least one battery of the vehicle.

In other features, the method includes determining a propulsion limitation condition of the vehicle according to a state of charge of the at least one battery, supplying the haptic feedback signal to the vibration transducer in response to a determination that the state of charge is greater than a propulsion limitation threshold, and inhibiting supplying the haptic feedback signal to the vibration transducer in response to a determination that the state of charge is less than the propulsion limitation threshold.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While an internal combustion engines may provide tactile feedback to a driver though the acceleration pedal for some indication of a level of power being generated by the internal combustion engine, electric vehicle motors (or other motor types) may vibrate less and provide less (or not) tactile feedback to the driver via an acceleration pedal. Some example embodiments described herein reintroduce vibrations to the acceleration pedal in an intelligent, haptic controlled manner. This provides an enhanced driving experience which allows the driver to be more in tune with the vehicle performance. This may also help mitigate accidental over acceleration, and aid in providing a safer driving experience (e.g., because the vibration supplied to the acceleration pedal provides more tactile feedback to the driver about a current level of power being generated by the vehicle motor.

The haptic feedback signal supplied to, for example, a vibration transducer mechanically connected with the acceleration pedal, may be varied based on sensed operating parameters of the vehicle. Example operating parameters may include, but are not limited to, a drive mode setting of the vehicle (e.g., sport mode or economy mode), a state of charge of one or more batteries of the vehicle, a transmission gear state of the vehicle, a position of a brake pedal, a position of the acceleration pedal, a speed value of the vehicle, an acceleration value of the vehicle, etc.

Figure 1:
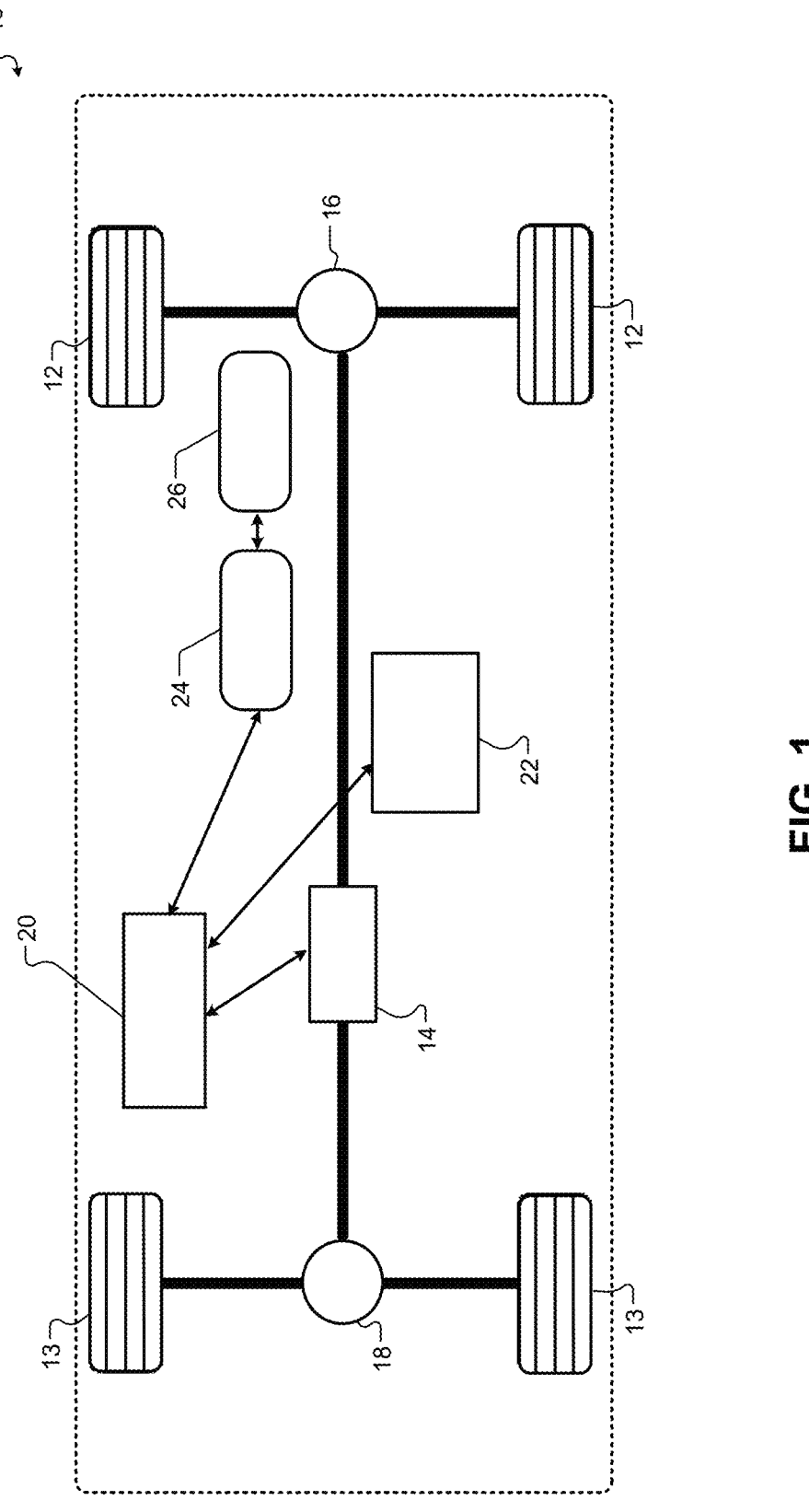
FIG. 1 is a diagram of an example vehicle including a haptic feedback system for an acceleration pedal.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration pedal, a brake pedal, a transmission gear state, a vehicle camera, a braking system, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors 22 (such as cameras, microphones, pressure sensors, wheel position sensors, brake sensors, acceleration pedal sensors, accelerometers, location sensors such as global positioning system (GPS) antennas, etc.). Some sensors may be configured to monitor current motion of the vehicle, acceleration of the vehicle, braking of the vehicle, a position or depression distance of the acceleration pedal, steering torque, etc.

As shown in FIG. 1, the vehicle 10 includes an acceleration pedal 26, which is configured to control acceleration of the vehicle 10. For example, the acceleration pedal 26 may control an amount of torque generated by the drive unit 14 (such as when the drive unit 14 includes an electric motor), based on how much the acceleration pedal 26 is depressed. In some embodiments, pressing down on the acceleration pedal 26 with increased force, or to increase the distance the acceleration pedal 26 is depressed from a resting baseline position, may increase the amount of torque generated by the drive unit 14.

A vibration transducer 24 is connected with the acceleration pedal 26. For example, the vibration transducer 24 may be mechanically connected with the acceleration pedal 26, and configured to generate vibration of the acceleration pedal 26 in response to a haptic feedback signal supplied to the vibration transducer 24.

The vibration transducer 24 may include any suitable component(s) for converting an electrical signal (which may be received from the vehicle control module 20), into mechanical vibration of the acceleration pedal 26. For example, an actuator, a diaphragm membrane, etc. may be linked with the acceleration pedal 26 (such as mechanically connected to an upper portion or upper arm of the acceleration pedal 26), and may cause the acceleration pedal 26 to vibrate in response to vibrations or oscillations generated at the vibration transducer 24.

In some examples, a vehicle with smoother engine operation (such as an electric motor) may provide little to no tactile feedback to the driver regarding acceleration or other conditions of the vehicle, as compared to an internal combustion engine. For example, torque, rumbling, etc. of an internal combustion engine may provide tactile feedback to the acceleration pedal 26 via mechanical linkages, which causes the acceleration pedal 26 to shake, vibrate, generate increase resistance, etc.

This tactile feedback may be sensed by the driver (e.g., via the driver's foot on the acceleration pedal 26), to provide more feedback on an acceleration state of the vehicle 10. In situations where there is less mechanical feedback, such as an electric motor, the vibration transducer 24 may simulate tactile feedback that could otherwise be present (e.g., if the drive unit 14 included an internal combustion engine), so the driver can have a similar experience of sensing tactile feedback though the acceleration pedal 26.

The vehicle control module 20 may communicate with another device (such as another vehicle in the automated vehicle driving platoon) via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

The vehicle 10 also includes a user interface. The user interface may include any suitable displays (such as on a dashboard, a console, or elsewhere), a touchscreen or other input devices, speakers for generation of audio, etc.

In some example embodiments, the vehicle control module 20 may be configured to receive vehicle operation parameters via, e.g., a controller area network (CAN) bus of the vehicle. The vehicle control module may a series of decisions to determine whether tactile input should be provided through the acceleration pedal to communicate the amount of acceleration or torque that is being generated via the motor, according to the received vehicle operation parameters.

For example, the acceleration pedal tactile feedback may be enabled if the drive mode is an advanced driving mode, the vehicle is in a drive or reverse gear state, a battery of the vehicle has a sufficient level of state of charge, etc. Additionally, other vehicle operation parameters such as the current transmission gear state, accelerator pedal and brake pedal positions, etc., may be used to determine a haptic profile and gain for a haptic feedback signal supplied to a vibration transducer. This haptic feedback algorithm may communicate to the driver how much power is being generated by the motor.

In some example embodiments, the haptic feedback signal may have a frequency defined within a range of vibrations per millisecond. By increasing the VPM, the vehicle control module may communicate that additional power is being generated by the motor. In other examples, changing the wave from, e.g., a triangle wave to a square wave, the perception of the haptic feedback may be changed (such as to indicate a current vehicle gear state).

Figure 2A:
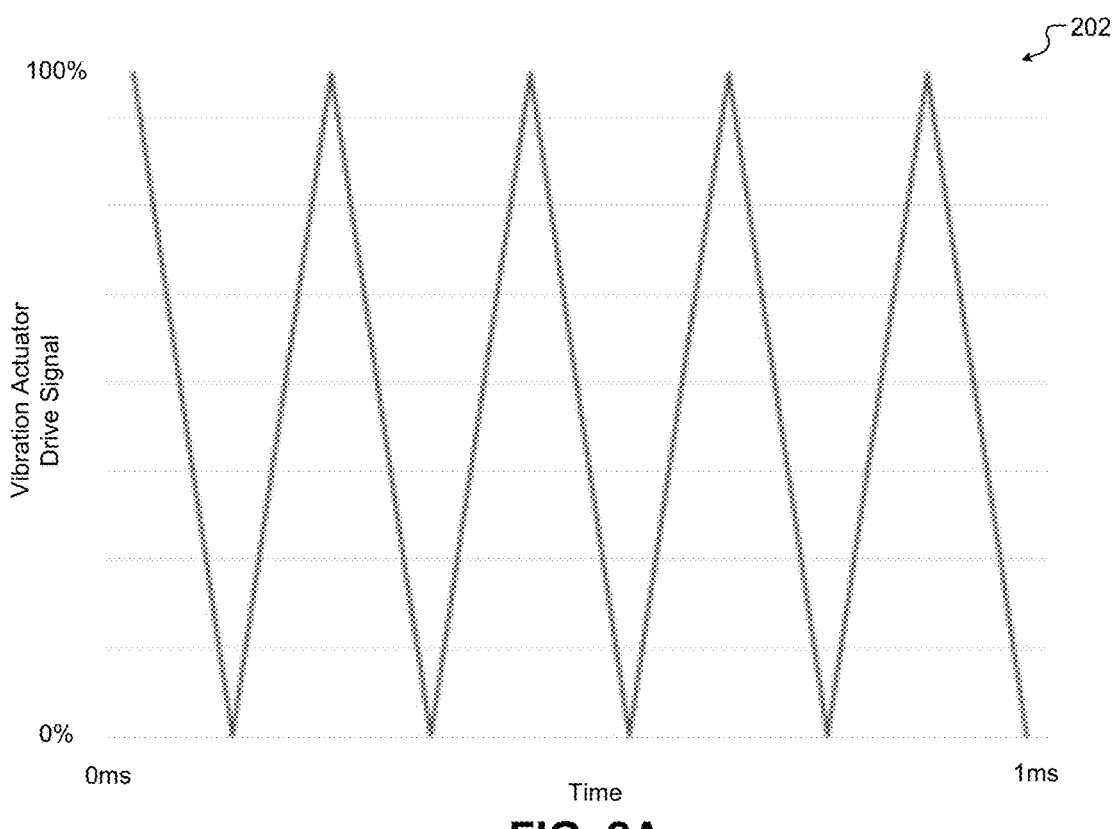
FIGS. 2A-2D are diagrams of example acceleration pedal haptic feedback signals having different frequencies.

FIGS. 2A-2D are diagrams of example acceleration pedal haptic feedback signals having different frequencies. FIG. 2A illustrates a drive signal 202 having a signal frequency corresponding to low level of acceleration pedal activation, such as when the acceleration pedal 26 is pressed between 0% and 25% of a fully depressed distance (e.g., where 0% is a resting baseline position when the acceleration pedal is not pressed at all, and 100% is a position where the acceleration is pressed in by the driver as far as it will go).

In FIG. 2A, the vibration actuator drive signal is a triangular wave signal which goes back and forth between 0% (e.g., zero volts or a minimum value supplied to the vibration transducer), and 100% (e.g., a maximum value supplied to the vehicle transducer such as five volts, twelve volts, twenty four volts, etc.). The vibration actuator drive signal may be supplied from the vehicle control module 20 to the vibration transducer 24.

FIG. 2A illustrates the vibration actuator drive signal as having a frequency of ten vibrations per millisecond. In other example embodiments, the low range of acceleration pedal depression may have a higher or lower frequency, the range may have end points other than 0% and 25%, etc. Other suitable drive signals may be used, such as square waves, sine waves, etc.

Figure 2B:
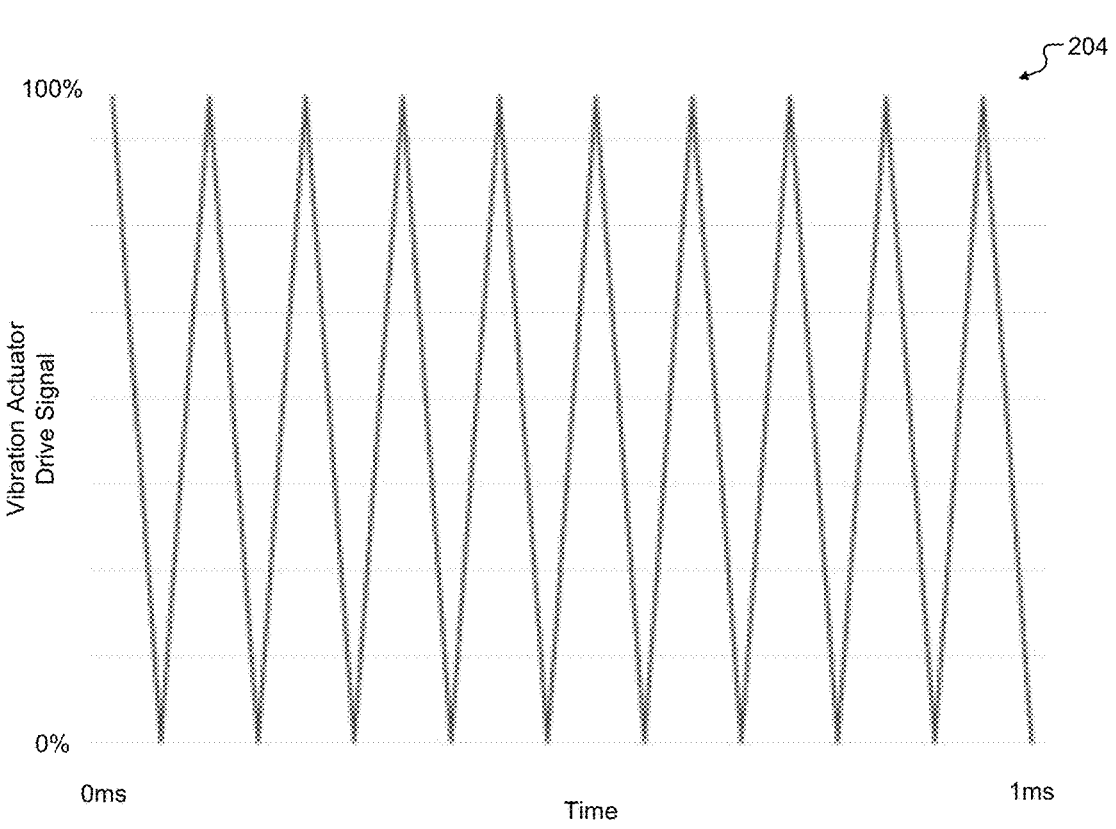

FIG. 2B illustrates the vibration actuator drive signal 204 for a second example acceleration depression range, such as when the acceleration pedal 26 is pressed 25% to 50% of a full range of movement. As shown in FIG. 2B, the example frequency of the drive signal corresponding to the 25% to 50% range of acceleration pedal depression is twenty vibrations per millisecond. In other example embodiments, the second range of acceleration pedal depression may use other range endpoints, may use other frequency values, etc.

Figure 2C:
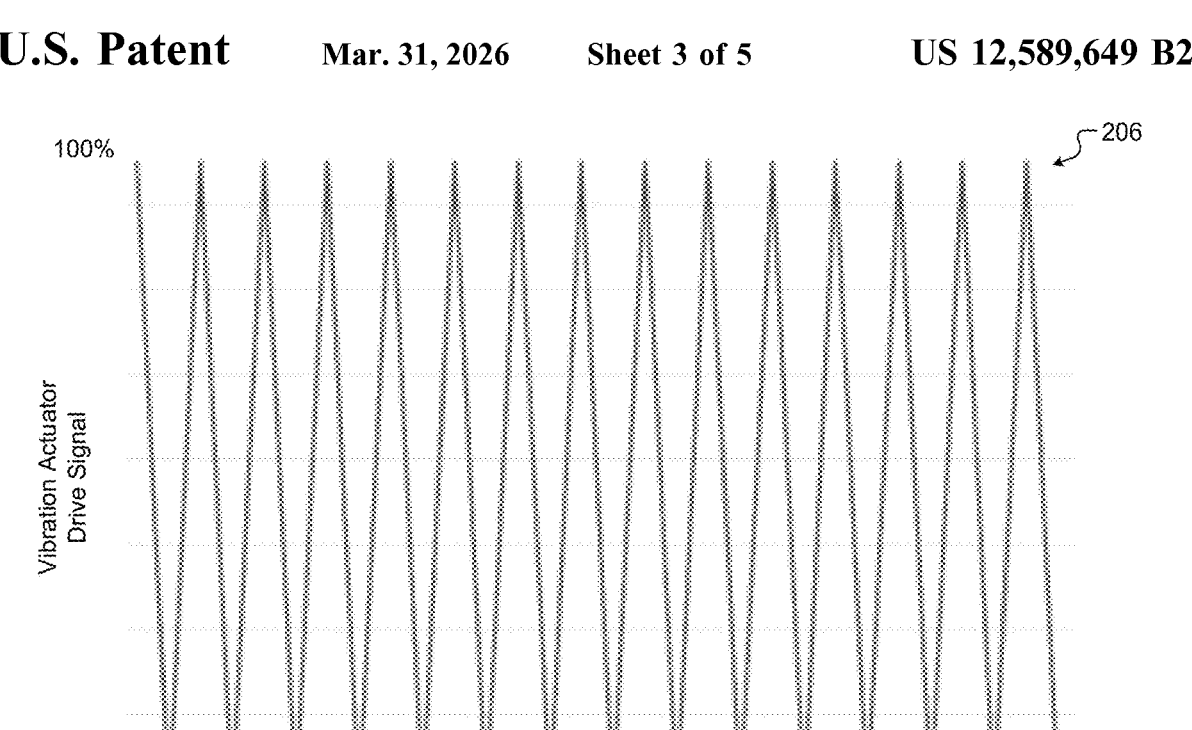

FIG. 2C illustrates the vibration actuator drive signal 206 for a third example acceleration depression range, such as when the acceleration pedal 26 is pressed 50% to 75% of a full range of movement. As shown in FIG. 20, the example frequency of the drive signal corresponding to the 50% to 75% range of acceleration pedal depression is thirty vibrations per millisecond. In other example embodiments, the third range of acceleration pedal depression may use other range endpoints, may use other frequency values, etc.

Figure 2D:
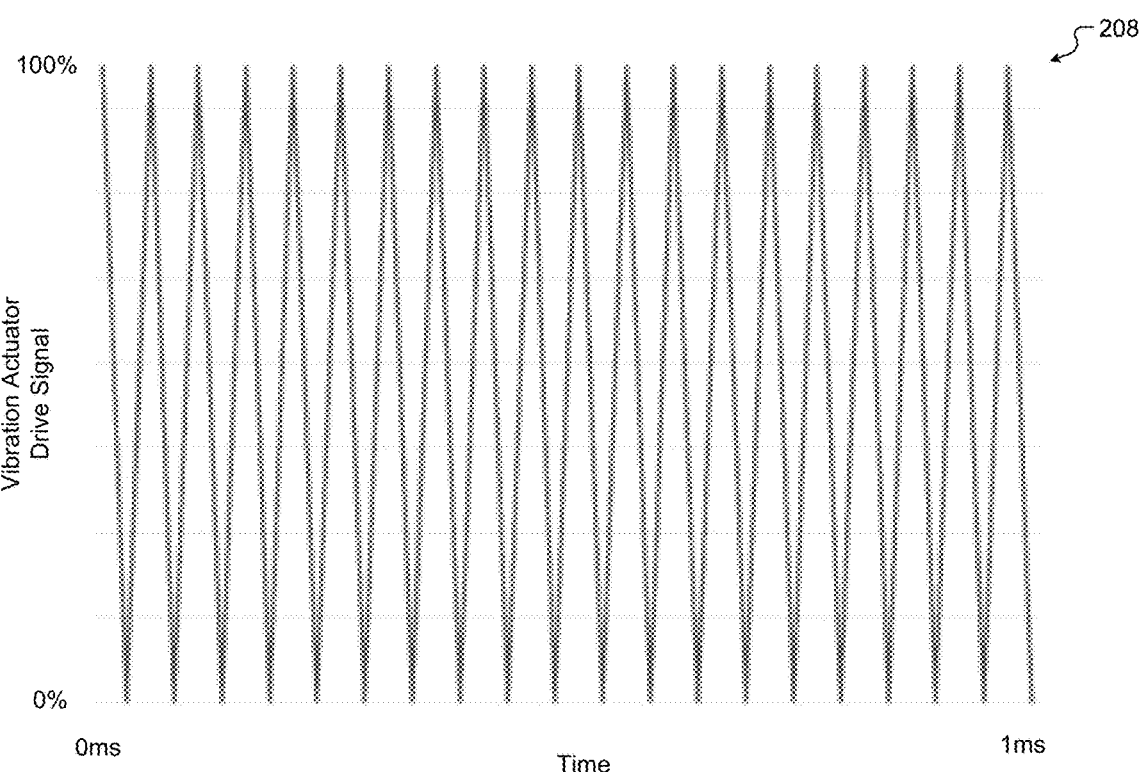

FIG. 2D illustrates the vibration actuator drive signal 208 for a third example acceleration depression range, such as when the acceleration pedal 26 is pressed 75% to 100% of a full range of movement. As shown in FIG. 2D, the example frequency of the drive signal corresponding to the 75% to 100% range of acceleration pedal depression is forty vibrations per millisecond. In other example embodiments, the fourth range of acceleration pedal depression may use other range endpoints, may use other frequency values, etc.

Although FIGS. 2A-2D illustrate four different ranges of acceleration pedal depression, other embodiments may use more or less ranges, ranges with different end points, a frequency that scales linearly with acceleration pedal position in a continuous manner, etc. Other example embodiments may use other vibration frequencies.

In some example embodiments, the vibration might also be in sync with an engine sound (such as by generating an engine sound to be played via vehicle speakers), to provide a reference of vehicle speed. This driving enhancement may generate excitement, while communicating potential vehicle torque and performance to the driver.

Example embodiments of intelligent acceleration pedal vibration may also be applied to other vehicle areas, such as tactile feedback vibration of a seat, tactile feedback vibration of the steering wheel, tactile feedback vibration of a brake pedal, tactile feedback vibration of a door panel, tactile feedback vibration of a center console, etc., to provide a wholistic experience for the driver.

In some example embodiments, haptic vibration of the acceleration pedal may be accompanied by lights in the dashboard, the speedometer, etc., where a brightness and color of the lights varies according to an amount of power being generated by the vehicle motor.

In different driving mode settings, the haptic feedback feature for the acceleration pedal may be selectively activated or deactivated, depending on a driver's preference. Example embodiments, may utilize displays, lighting and haptic systems to provide visual indication of potential torque buildup of the motor.

Figure 3:
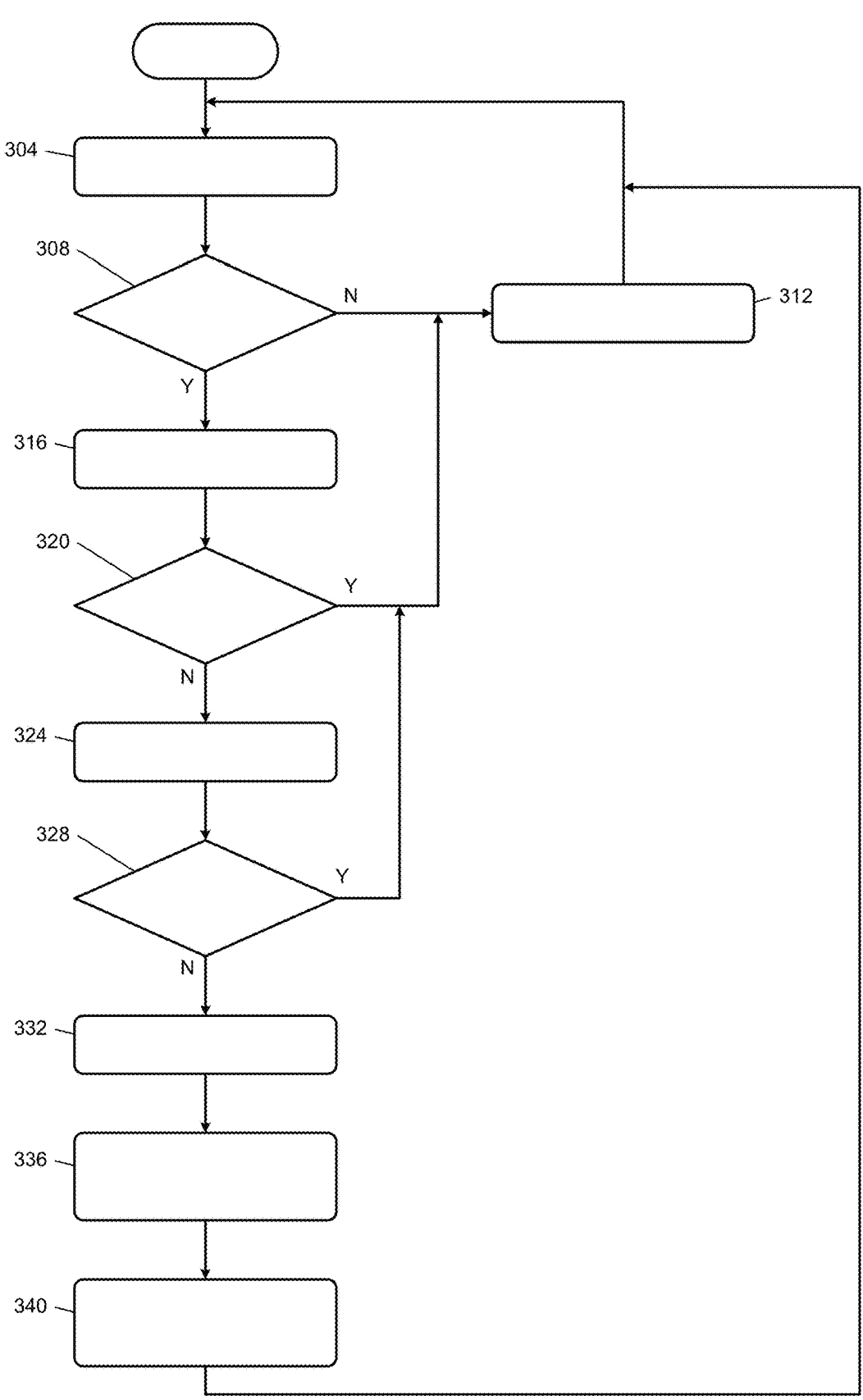
FIG. 3 is a flowchart depicting an example process for controlling haptic feedback for an acceleration pedal of a vehicle.

FIG. 3 is a flowchart depicting an example process for controlling haptic feedback for an acceleration pedal of a vehicle. The process illustrated in FIG. 3 may be performed by, for example, the vehicle control module 20 of FIG. 1.

At 304, the process begins by identifying a drive mode selection status of the vehicle. For example, the vehicle may be in a sport mode, a track mode, an offroad mode, an economy mode, a normal mode, etc. The vehicle control module is configured to determine whether an advanced driving mode is activated at 308, such as a sport mode, a track mode, and offroad mode, etc.

If an advance driving mode is not currently set at 308 (e.g., because the vehicle is in a normal mode, an economy mode, etc.), the process proceeds to 312 to disable acceleration pedal haptic feedback. For example, a driver may be less interested in tactile feedback while driving in a normal or economy mode, but the driver may have a greater desire to 'feel' the acceleration of the engine via tactile feedback through the acceleration pedal when driving in a sport or other advanced driving mode.

If the vehicle is in an advanced driving mode at 308, the vehicle control module is configured to determine a propulsion limitation status at 316. For example, if a state of charge of the battery is below a threshold value (such as less than 25% of a full state of charge, less than 10% of a full state of charge, etc.), the vehicle may be configured to limit other less essential features of the vehicle, to preserve battery charge for use in propulsion of the vehicle.

If the vehicle is currently in a propulsion limited state at 320 (e.g., due to a low state of charge of a battery of the vehicle), control proceeds to 312 to disable acceleration pedal haptic feedback at 312. If the vehicle is not in a propulsion limited state at 320, control proceeds to 324 to determine a current transmission gear state of the vehicle.

For example, the vehicle control module may determine whether the vehicle is currently in drive, is in reverse, is in neutral, etc. In some example embodiments, haptic feedback may only be provided when the vehicle is in drive or reverse, as the driver may not desire acceleration pedal tactile feedback when the car is in neutral and not moving.

If the vehicle is currently in neural at 328, control proceeds to 312 to disable the acceleration pedal haptic feedback. If the vehicle is not in neutral at 328, control proceeds to 332 to select a haptic feedback profile. For example, the haptic feedback profile may vary an intensity of the tactile feedback provided to the acceleration pedal 26 via the vibration transducer 24, such as by increasing or decreasing an amplitude of the haptic feedback signal, increasing or decreasing a frequency of the haptic feedback signal, selecting a shape of the haptic feedback signal (e.g., a triangle wave, square wave, or sine wave), etc. Additional details regarding selection of a haptic feedback profile are explained further below with reference to FIG. 4.

At 336, the vehicle control module is configured to output the selected haptic feedback signal to the vibration transducer. The vibration transducer is configured to vibrate the acceleration pedal according to the selected haptic feedback signal, at 340.

Figure 4:
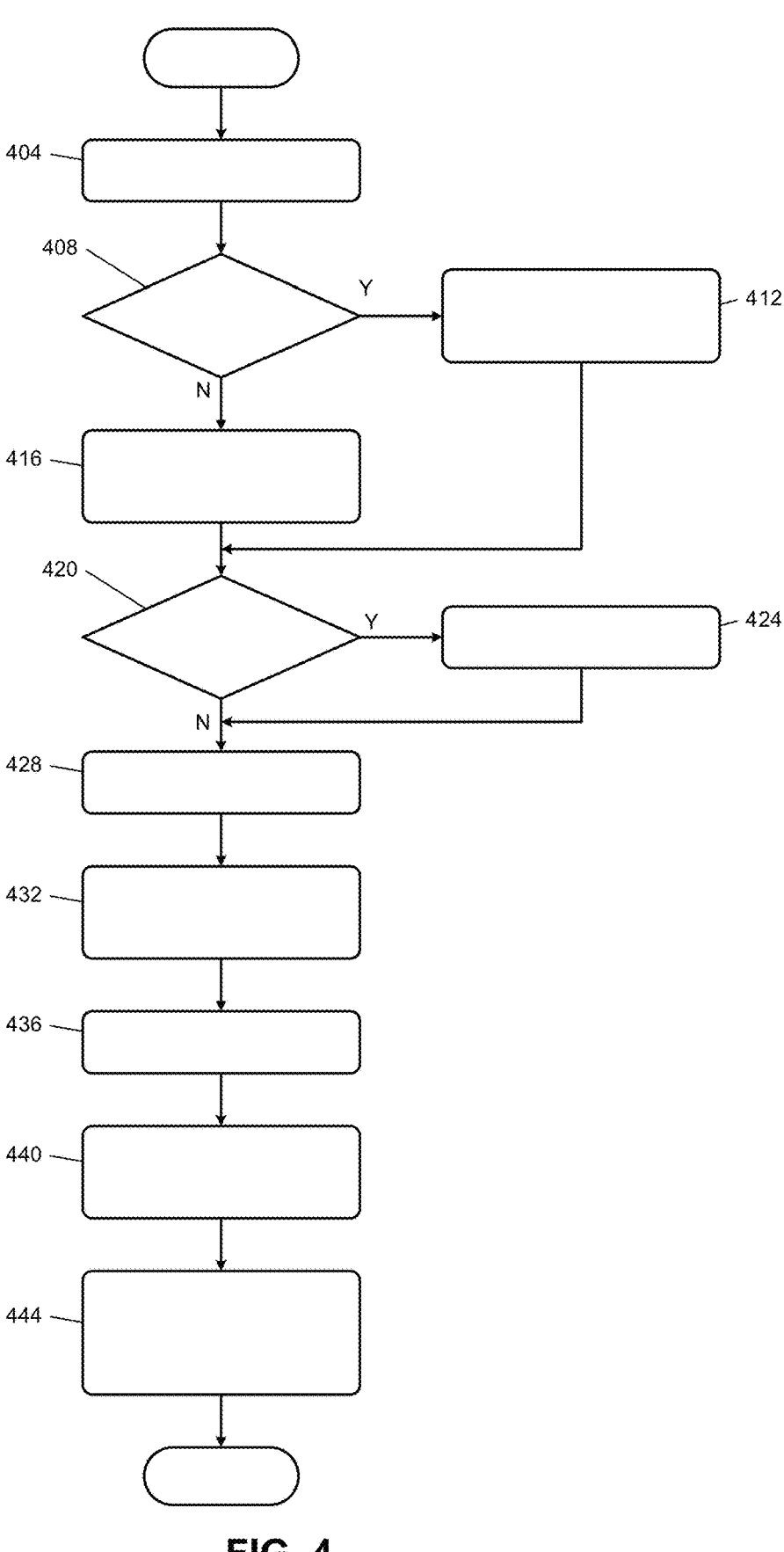
FIG. 4 is a flowchart depicting an example process for selecting profile parameters of a haptic feedback signal for an acceleration pedal of a vehicle.

FIG. 4 is a flowchart depicting an example process for selecting profile parameters of a haptic feedback signal for an acceleration pedal of a vehicle. The process illustrated in FIG. 4 may be performed by, for example, the vehicle control module 20 of FIG. 1.

At 404, the vehicle control module is configured to determine a current transmission state. If the vehicle is in a drive gear at 408, control proceeds to 412 to set haptic profile parameters according to the drive gear profile for the haptic feedback signal.

If the vehicle is in a reverse gear at 408, control proceeds to 416 to set haptic profile parameters to reverse gear settings. For example, the drive gear profile and the reverse gear profile may use different types of haptic feedback signals for the acceleration pedal, such as a triangle wave signal used in the drive gear profile and a square wave signal used in the reverse gear profile. This may allow a driver to sense a different tactile feedback response through the acceleration pedal depending on whether they are driving forwards or in reverse.

At 420, the vehicle control module is configured to determine whether a brake pedal of the vehicle is depressed. If so, control proceeds to 424 to apply a gain multiplier to the haptic profile parameters. For example, the vehicle control module may be configured to apply no gain multiplier when the brake pedal is not pressed, but apply a specified gain multiplier (e.g., a 2× multiplier, a 4× multiplier, etc.) to the haptic feedback signal of the acceleration pedal when the brake pedal is depressed. This may be used to generate additional acceleration feedback if the driver is increasing motor torque via the acceleration pedal while also holding the vehicle in place with the brake pedal.

At 428, the vehicle control module is configured to determine an acceleration pedal position (e.g., how far in the acceleration pedal is pressed). The vehicle control module is then configured to set a vibration frequency according to the acceleration pedal position.

For example, the vehicle control module may use a frequency of about ten vibrations per millisecond (VPM) when the acceleration pedal position is in a range of 0-25% of a full depression range of the acceleration pedal, a frequency of about twenty vibrations per millisecond when the acceleration pedal position is in a range of 25-50% of a full depression range of the acceleration pedal, a frequency of about thirty vibrations per millisecond when the acceleration pedal position is in a range of 50-75% of a full depression range of the acceleration pedal, and a frequency of about forty vibrations per millisecond when the acceleration pedal position is in a range of 75-100% of a full depression range of the acceleration pedal. These values are only examples, and other example embodiments may use or more less ranges, ranges with different end points, a vibration frequency which scales linearly with respect to a depression distance of the acceleration pedal, other vibration frequency values, etc.

At 436, the vehicle control module is configured to determine a current vehicle acceleration value, such as a longitudinal acceleration of the vehicle. The vehicle control module is configured to modify the selected vibration frequency according to the vehicle acceleration, at 440.

For example, if the longitudinal acceleration is approximately zero (e.g., steady state vehicle speed), the vehicle control module may not apply any modification to the vibration frequency which was selected based on the acceleration pedal position.

If the longitudinal acceleration is greater than zero but less than 0.25*G (e.g., 0.25 times the force of gravity), the vehicle control module may apply a gain factor of 1.5 to the vibration frequency which was selected based on the acceleration pedal position. If the longitudinal acceleration is greater than 0.25*G but less than 1*G, the vehicle control module may apply a gain factor of two to the vibration frequency which was selected based on the acceleration pedal position (e.g., double the selected vibration frequency).

If the longitudinal acceleration is greater than 1*G, the vehicle control module may apply a gain factor of three to the vibration frequency which was selected based on the acceleration pedal position (e.g., double the selected vibration frequency). These values are for example only, and other example embodiments may use more or less acceleration ranges, ranges with different end points, a gain multiplier which increases linearly with respect to vehicle acceleration in a continuous manner, etc. Other example embodiments may use different gain multiplier values.

At 444, the vehicle control module is configured to set the haptic feedback signal according to the specified haptic profile parameters. For example, the vehicle control module may supply a drive signal to the vibration transducer having a frequency and wave shape which corresponds to a current transmission gear of the vehicle, current acceleration and brake pedal positions, and a current acceleration of the vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A haptic feedback system for a vehicle acceleration pedal, the haptic feedback system comprising:
  an acceleration pedal configured to control acceleration of a motor of a vehicle;
  a vibration transducer mechanically connected with the acceleration pedal, the vibration transducer configured to vibrate the acceleration pedal according to a haptic feedback signal supplied to the vibration transducer;
  at least one vehicle sensor configured to sense one or more vehicle operation parameters; and
  a vehicle control module configured to:
    obtain the one or more vehicle operation parameters via the at least one vehicle sensor;

selectively supply the haptic feedback signal to the vibration transducer according to the one or more vehicle operation parameters, to selectively vibrate the acceleration pedal;
    determine a transmission gear state of the vehicle;
    select a first waveform shape of the haptic feedback signal and supply the haptic feedback signal to the vibration transducer in response to a determination that the transmission gear state is a drive gear state;
    select a second waveform shape of the haptic feedback signal and supply the haptic feedback signal to the vibration transducer in response to a determination that the transmission gear state is a reverse gear state, wherein the second waveform shape is different than the first waveform shape, and each of the first waveform shape and the second waveform shape include at least one of a triangle wave signal, a square wave signal or a sine wave signal; and
    inhibit supplying the haptic feedback signal to the vibration transducer in response to a determination that the transmission gear state is a neutral state.

2. The haptic feedback system of claim 1, wherein the vehicle control module is configured to:
  determine a drive mode setting of the vehicle;
  supply the haptic feedback signal to the vibration transducer in response to a determination that the drive mode setting is a sport mode; and
  inhibit supplying the haptic feedback signal to the vibration transducer in response to a determination that the drive mode setting is an economy mode.

3. The haptic feedback system of claim 1, wherein the motor is an electric motor powered by at least one battery of the vehicle.

4. The haptic feedback system of claim 3, wherein the vehicle control module is configured to:
  determine a propulsion limitation condition of the vehicle according to a state of charge of the at least one battery;
  supply the haptic feedback signal to the vibration transducer in response to a determination that the state of charge is greater than a propulsion limitation threshold; and
  inhibit supplying the haptic feedback signal to the vibration transducer in response to a determination that the state of charge is less than the propulsion limitation threshold.

5. The haptic feedback system of claim 1, wherein the vehicle control module is configured to:
  determine a position of a brake pedal of the vehicle; and
  apply a gain multiplier value to the haptic feedback signal in response to a determination that the brake pedal is in depressed position.

6. The haptic feedback system of claim 1, wherein the vehicle control module is configured to:
  obtain a position of the acceleration pedal;
  determine a signal frequency corresponding to the position of the acceleration pedal; and
  supply the haptic feedback signal to the vibration transducer at the determined signal frequency corresponding to the position of the acceleration pedal.

7. The haptic feedback system of claim 6, wherein the vehicle control module is configured to:
  select a first frequency value in response to the position of the acceleration pedal being depressed within a first depression distance range; and
  select a second frequency value in response to the position of the acceleration pedal being depressed within a second depression distance range, wherein the second frequency value is greater than the first frequency value, and the second depression distance range is greater than the first depression distance range.

8. The haptic feedback system of claim 6, wherein the vehicle control module is configured to:

obtain a longitudinal acceleration value of the vehicle;

determine a frequency gain value corresponding to the longitudinal acceleration value of the vehicle; and apply the determined frequency gain value to the haptic feedback signal supplied to the vibration transducer.

9. The haptic feedback system of claim 6, wherein the signal frequency is in a range from ten vibrations per millisecond to forty vibrations per millisecond.

10. The haptic feedback system of claim 1, wherein the one or more vehicle operation parameters include at least one of a drive mode setting of the vehicle, a state of charge of a battery of the vehicle, the transmission gear state of the vehicle, a position of a brake pedal of the vehicle, a position of the acceleration pedal, a speed value of the vehicle, and an acceleration value of the vehicle.

11. The haptic feedback system of claim 1, wherein the vehicle control module is configured to obtain the one or more vehicle operation parameters via a controller area network (CAN) bus of the vehicle.

12. The haptic feedback system of claim 1, wherein the haptic feedback signal supplied to the vibration transducer includes at least one of the triangle wave signal and the square wave signal.

13. The haptic feedback system of claim 1, wherein the vehicle control module is configured to selectively supply haptic feedback to vibrate at least one of a steering wheel of the vehicle, a brake pedal of the vehicle, a seat of the vehicle, a door panel of the vehicle, or a center console of the vehicle, according to the one or more vehicle operation parameters.

14. The haptic feedback system of claim 1, wherein the vehicle control module is configured to selectively control a level of brightness of one or more lights of a dashboard of the vehicle, according to the one or more vehicle operation parameters.

15. The haptic feedback system of claim 1, wherein the vehicle control module is configured to selectively control at least one speaker of the vehicle to generate a simulated internal combustion engine noise, according to the one or more vehicle operation parameters.

16. A method of controlling haptic feedback system for a vehicle acceleration pedal, the method comprising:

controlling acceleration of a motor of a vehicle via a position of an acceleration pedal;

vibrating the acceleration pedal via a vibration transducer mechanically connected with the acceleration pedal, the vibration transducer configured to vibrate the acceleration pedal according to a haptic feedback signal supplied to the vibration transducer;

sensing one or more vehicle operation parameters via at least one vehicle sensor;

selectively supplying the haptic feedback signal to the vibration transducer according to the one or more vehicle operation parameters, to selectively vibrate the acceleration pedal;

determine a transmission gear state of the vehicle;

select a first waveform shape of the haptic feedback signal and supply the haptic feedback signal to the vibration transducer in response to a determination that the transmission gear state is a drive gear state;

select a second waveform shape of the haptic feedback signal and supply the haptic feedback signal to the vibration transducer in response to a determination that the transmission gear state is a reverse gear state, wherein the second waveform shape is different than the first waveform shape, and each of the first waveform shape and the second waveform shape include at least one of a triangle wave, a square wave or a sine wave; and inhibit supplying the haptic feedback signal to the vibration transducer in response to a determination that the transmission gear state is a neutral state.

17. The method of claim 16, further comprising:

determining a drive mode setting of the vehicle;

supplying the haptic feedback signal to the vibration transducer in response to a determination that the drive mode setting is a sport mode; and inhibiting supplying the haptic feedback signal to the vibration transducer in response to a determination that the drive mode setting is an economy mode.

18. The method of claim 16, wherein the motor is an electric motor powered by at least one battery of the vehicle.

19. The method of claim 18, further comprising:

determining a propulsion limitation condition of the vehicle according to a state of charge of the at least one battery;

supplying the haptic feedback signal to the vibration transducer in response to a determination that the state of charge is greater than a propulsion limitation threshold; and inhibiting supplying the haptic feedback signal to the vibration transducer in response to a determination that the state of charge is less than the propulsion limitation threshold.

* * * * *